Patented Dec. 12, 1933

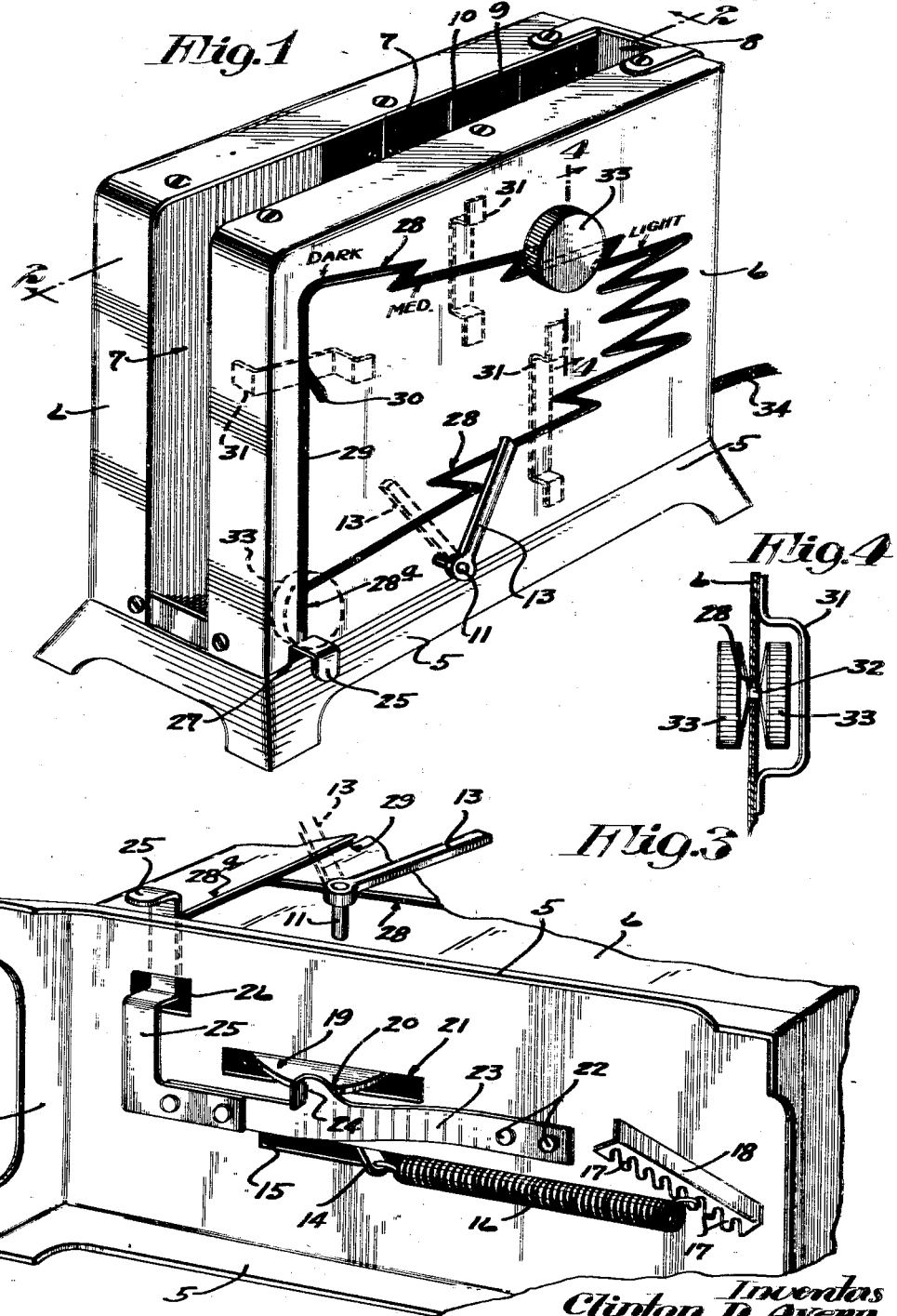

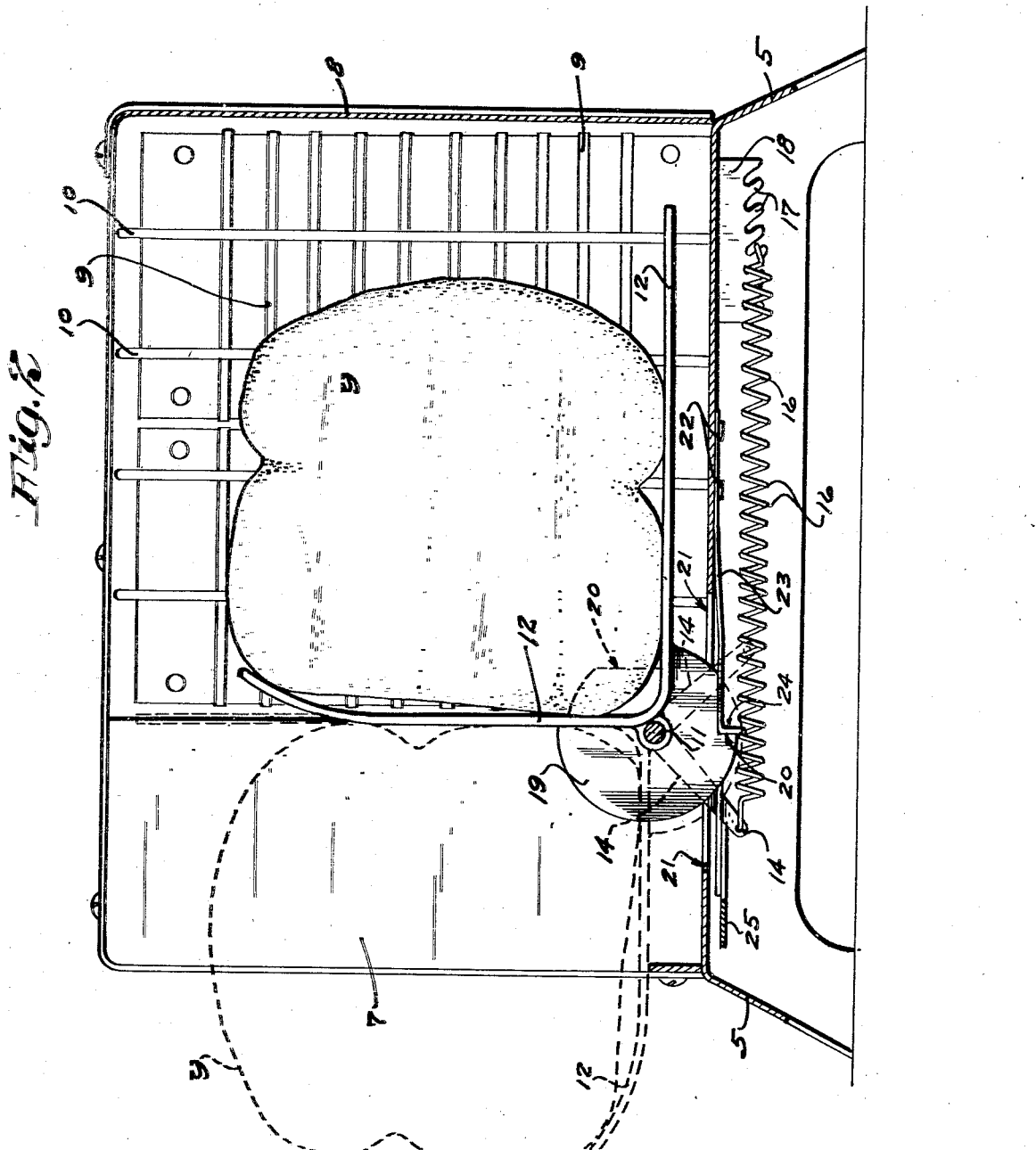

1,939,247

UNITED STATES PATENT OFFICE 1,939,247

AUTOMATIC TOASTER

Clinton D. Avery and Herbert C. Berry, Minneapolis, Minn.

Application March 3, 1932. Serial No. 596,488

15 Claims. (Cl. 161—16)

Primarily, my invention relates to timed toasters but broadly includes a variable time mechanism for controlling the action of various devices or apparatus that require regulation in accordance with varying periods of time, and generally stated, the invention consists of the novel devices and combinations of devices hereinafter described and defined in the claims.

The preferred form of the device is here illustrated as combined with elements of the toaster in a novel, very simple and highly efficient cooperative relation. The objects of the invention, generally stated, are simplicity and low cost of construction, ease of manipulation and high efficiency in action.

The novel timing mechanism or device includes the combination of a zig-zag channel run-way and a fly wheel-equipped roller arranged to run in said channel. The channel run-way has a general downward trend. The roller, which is small in diameter as compared with a fly wheel portion thereof, has rolling contact with the zig-zag channel and under the action of gravity will run down the said channel, and, of course, the time required for it to reach the bottom of the channel or the tripping point, where it is made to act upon a controlling device, such as the trip of an electric toaster will depend on the altitude at which the roller is released for action in the channel.

When the roller is released for action in an inclined portion of the channel, it will start its downward rolling action, first, of course, gravity must overcome the inertia in the roller and its fly wheel or wheels. Then when the roller reaches the limit of one incline of the channel, its downward movement will be interrupted until the momentum acquired by the inertia of the fly wheel or wheels is overcome and the roller is, under the action of gravity, caused to roll in the opposite direction from the first noted direction. It will, of course, be understood that the various inclines of the so-called zig-zag channel are alternately in opposite directions and by providing the channel with quite a large number of reverse inclines and making the inclines only a little more than sufficient to cause the roller to freely run down the same under the action of gravity the time required for the roller to move from a starting point to a tripping or operating point may be delayed for quite a considerable time, and which will be sufficient for the toasting operation or other operation that is to be controlled. The invention will be made more clear by the following description of the drawings, wherein the invention is indicated as applied to an electrical toaster of simple and novel construction and in which drawings like characters indicate like parts throughout the several views.

Referring to the drawings:

Fig. 1 is a three-quarter perspective view of a complete toaster incorporating the invention;

Fig. 2 is a longitudinal vertical section taken on the line 2—2 of Fig. 1;

Fig. 3 is a fragmentary bottom perspective view of the toaster; and

Fig. 4 is a fragmentary detail sectional view taken on the line 4—4 of Fig. 1.

The toaster illustrated includes a base 5, opposed pan-like casing wall sections 6 that are spaced apart to afford a toasting chamber or oven 7 therebetween, and an end wall member 8 that forms a closure for one end of the oven. The other end and top of which oven 7 are open. Suitably secured in each of the opposed casing sections 7 are suitable electric heating elements 9. To keep bread y from coming in contact with the heating elements 9, a plurality of bread supporting wires 10 are provided in parallel spaced relation to each heating element. Mounted within the oven on a journaled operating shaft 11 is an L-shaped bread carrier 12. The shaft 11 is journaled in opposite casing sections 6 and is provided at one projected end with a resetting lever 13. The bread carrier 12 is mounted fast on the journal shaft 11 and is provided with a depending operating lever 14 that works through an opening 15 in the base 5. Secured at one end to the free end portion of the lever 14 is a coiled tension spring 16, the other end of which is hooked over a desired tooth 17 of an anchoring flange 18 that depends from the bottom of the base 5. The tension of the spring can be readily adjusted by hooking one end of the spring 16 over a different tooth 17 of the anchor flange 18. The spring 16 moves and normally maintains the bread carrier 12 in an inoperative position, shown by dotted lines in Fig. 2.

Carried rigidly by the axial portion of the bread carrier 12 is an eccentric 19 that is formed with a latch detent 20. This eccentric 19 works through an opening 21 in the base 5. Rigidly secured near one end to the underside of the base 5 by rivets or the like 22 is a leaf spring latch member 23 having a projecting latch dog 24 that is normally spring pressed against the bottom surface of the eccentric 19 and which, when the bread carrier is moved to an operative position, as indicated by full lines in Fig. 2, falls into the detent 20 and holds the bread carrier against movement under the action of the spring 16. The spring latch member 23 is provided near its free end portion and beyond the latch dog 24 thereof with an L-shaped extension 25 that projects upwardly through an opening 26 in the base 5 and outwardly through an opening 27 in one of the side plates 6.

The zig-zag channel of the timing mechanism is illustrated as being in the form of a zig-zag declined groove 28 formed in one of the casing side wall sections 6. The upper end of this channel groove 28 is near one upper corner of the toaster casing. The lower end thereof is in substantially the same vertical plane therewith and terminates in a short vertical portion 28a directly over the free end portion of the extension 25 of the spring latch member 23. The upper and lower extremities of the channel 28 are connected by a vertical roller return channel 29 that is provided at its intermediate portion with an inclined notch 30. Since the channels 28 and 29 completely sever the central portions of the grooved side wall 6 from the outer portions thereof, suitable anchoring brackets 31 are provided on the inside on the casing wall for securing the severed parts thereof together. These brackets may be assumed to be secured to the grooved side wall 6 by any suitable means such as spot welding. The roller, indicated by 32, is of less diameter than the grooves or channels 28 and 29 and is provided, in opposed axially spaced relation, with a pair of fly wheels 33 that are of much greater diameter than the roller 32 and operate one on each side of the side wall 6. These fly wheels 33 guide the roller 32 in the grooves or channels 28 and 29 and prevent accidental removal of the roller from the channels. The brackets 31, it will be noted, are U-shaped and connect to the side wall 6 at points sufficiently spaced from the groove to permit the inner of the rollers 33 to pass therethrough.

Operation

The heating elements of the toaster may be assumed to be connected to a suitable source of potential through suitable leads contained in an extended cord 34. Bread y is placed on the pivoted bread carrier 12 when the same is in its inoperative position, as shown by dotted lines in Fig. 2, and to start a toasting operation the bread is moved into the oven by manual manipulation of the bread carrier resetting lever 13 to the position shown by full lines in Figs. 1 and 2. When the bread carrier is turned into its operative position, the latch dog 24 of the leaf spring latch member 23 will fall into the latch detent 20 of the cam 19 and will hold the bread carrier in an operative position against the action of the spring 16. The fly wheel-equipped roller 32 will be released for rolling action down the declined channel. The starting point will, of course, depend upon the degree of toasting action desired. For example, if a dark toast is desired, the roller will be released at the very top portion of the channel 28 marked "Dark"; if a medium toast is desired, the roller may be released for action at the point marked "Med."; and if only a light toast is desired, the roller will be released at or near the point marked "Light". The above noted markings appear on Fig. 1.

The roller, after being released, will roll down the reverse inclines of the channel 28 and will eventually drop into the vertical extension 28a and will drop upon the extension 25 of the latch spring 23 with sufficient force to move the latch dog 24 out of engagement with the latch detent 20 thereby releasing the latch and permitting the toasted bread to be moved out of the oven by the bread carrier 12 under the action of the spring 16.

When the toaster is in an inoperative condition, the roller 32 will usually be elevated in the return groove 29 to and dropped into the notch 30 and will be inoperative on the extension 25 of the latch 23 and is close to the starting point of the channel run-way 28. The return run-way 29 affords a very direct connection between the extremities of the run-way 29 and renders a rapid succession of toasting periods possible. The greatest timed period possible with the arrangement illustrated will, of course, depend upon several factors, to wit: the total length of the inclined channel run-way; the inclination of the various reversely declined sections; the spacing between the reversely inclined portions of the channel; the diameter of the roller; and the diameter and weight of the fly wheels 33. It will, of course, be apparent that if the inclination of the various sections of the channel run-way are declined only slightly, if the roller is small and the fly wheels are relatively large and heavy, that the speed of travel of the fly wheel-equipped roller will be very slow and the timing period consequently quite long. The spring latch member 23 is always under tension to engage the eccentric 19 and will therefor, after the latch is released, act as a brake on the eccentric 19 thereby retarding the movement of the bread carrier 12 under the action of the spring 16 from an operative to an inoperative position and such braking action will increase as the bread carrier moves toward an inoperative position. This retarding action is highly important as it prevents the bread carrier from moving so rapidly as to throw the bread therefrom at the completion of its movement.

What we claim is:

1. The combination with a function performing mechanism having a control element, of a time controlled actuating means for said control element comprising a declined surface and a roller arranged to roll on said declined surface and being provided beyond opposite sides of the declined surface with opposed fly wheels, said control element being located in the path of travel of said fly wheel-equipped roller where it will be acted upon by said roller at the completion of a predetermined downward movement.

2. The structure defined in claim 1 in further combination with means for intermittently interrupting the downward movement of said roller.

3. The combination with a function performing mechanism having a control element, of a time controlled actuating means for said control element comprising a declined channel run-way, a roller arranged to run in said channel run-way and being provided beyond opposite sides of the channel run-way with opposed fly wheels, said control element being located in the path of travel of said fly wheel-equipped roller where it will be acted upon by said roller at the completion of a predetermined downward movement.

4. The structure defined in claim 3, in which the run-way is designed to intermittently stop the roller during its downward movement.

5. The structure defined in claim 3, in which the run-way includes a plurality of reversely inclined portions.

6. The structure defined in claim 3 in which the run-way includes reversely inclined portions in further combination with a run-way connecting the upper and lower portions of the declined run-way.

7. The structure defined in claim 3 in further combination with a relatively direct return run-way connecting the extremities of the operative declined run-way.

8. The combination with a function performing mechanism having a control element, of a time controlled actuating means for said control element including a substantially vertically disposed sheet-like member, a zig-zag slot forming a run-way in said sheet member and a roller arranged to run in said zig-zag run-way, said control element being located in the path of travel of said roller where it will be acted upon by said roller at the completion of a predetermined downward movement.

9. The structure defined in claim 8 in which the roller is equipped with a fly wheel.

10. The structure defined in claim 8 in which the roller is equipped with opposed fly wheels, one on each side of the run-way and said fly wheels being larger in diameter than the slot is wide.

11. The structure defined in claim 8 in further combination with a relatively short return connecting extremities of the zig-zag channel run-way.

12. The structure defined in claim 8 in which the upper and lower extremities of the zig-zag channel run-way are in substantially the same vertical plane and in further combination with a relatively straight substantially vertical roller return run-way connecting the upper and lower extremities of the zig-zag run-way.

13. In a toaster the combination with a casing and function performing mechanism having a control element, of a time controlled actuating means for said control element comprising a zig-zag declined slot formed in a wall of the toaster casing and a roller arranged to run in said slot, said control element being located in the path of travel of said roller where it will be acted upon by the roller at the completion of a predetermined movement.

14. The structure defined in claim 13 in further combination with a roller return slot connecting the extremities of the zig-zag slot.

15. The structure defined in claim 13 in which the roller is provided with opposed fly wheels that work on opposite sides of the slot.

CLINTON D. AVERY.
HERBERT C. BERRY.